(12) United States Patent
LeBeane et al.

(10) Patent No.: US 12,086,422 B2
(45) Date of Patent: *Sep. 10, 2024

(54) EFFICIENT MEMORY-SEMANTIC NETWORKING USING SCOPED MEMORY MODELS

(71) Applicant: Advanced Micro Devices, Inc., Santa Clara, CA (US)

(72) Inventors: Michael W. LeBeane, Austin, TX (US); Khaled Hamidouche, Austin, TX (US); Hari S. Thangirala, Austin, TX (US); Brandon Keith Potter, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,819

(22) Filed: May 19, 2023

(65) Prior Publication Data
US 2023/0289070 A1    Sep. 14, 2023

Related U.S. Application Data

(63) Continuation of application No. 17/033,170, filed on Sep. 25, 2020, now Pat. No. 11,714,559.

(51) Int. Cl.
*G06F 3/06* (2006.01)
*G06F 12/02* (2006.01)
*G06F 12/0802* (2016.01)

(52) U.S. Cl.
CPC .......... *G06F 3/0619* (2013.01); *G06F 3/0656* (2013.01); *G06F 3/067* (2013.01); *G06F 12/0223* (2013.01); *G06F 12/0802* (2013.01); *G06F 2212/152* (2013.01)

(58) Field of Classification Search
CPC ...... G06F 3/0619; G06F 3/0656; G06F 3/067; G06F 12/0223; G06F 12/0802; G06F 2212/152; G06F 9/522; G06F 2212/1016; G06F 12/0804; G06F 12/0882;
(Continued)

(56) References Cited

U.S. PATENT DOCUMENTS

| 7,774,645 | B1 | 8/2010 | Clark et al. |
| 2004/0199732 | A1 | 10/2004 | Kelley et al. |
| 2014/0337848 | A1 | 11/2014 | Llamas et al. |

(Continued)

OTHER PUBLICATIONS

LeBeane, Michael Wayne, "Optimizing Communication for Clusters of GPUs," Dissertation at the University of Texas at Austin, Aug. 2018. (Year: 2018).*

(Continued)

*Primary Examiner* — Michael Krofcheck
(74) *Attorney, Agent, or Firm* — Volpe Koenig

(57) ABSTRACT

A framework disclosed herein extends a relaxed, scoped memory model to a system that includes nodes across a commodity network and maintains coherency across the system. A new scope, cluster scope, is defined, that allows for memory accesses at scopes less than cluster scope to operate on locally cached versions of remote data from across the commodity network without having to issue expensive network operations. Cluster scope operations generate network commands that are used to synchronize memory across the commodity network.

20 Claims, 8 Drawing Sheets

(58) Field of Classification Search
CPC ......... G06F 12/1072; G06F 2212/1056; G06F 2212/154; G06F 12/08
See application file for complete search history.

(56) References Cited

U.S. PATENT DOCUMENTS

| | | |
|---|---|---|
| 2016/0139624 A1 | 5/2016 | Orr et al. |
| 2018/0285174 A1 | 10/2018 | Che |
| 2019/0347125 A1 | 11/2019 | Sankaran et al. |

OTHER PUBLICATIONS

Howes, Lee, et al., "The OpenCL Specification," Khronos OpenCL Working Group, Version 2.0, Document Revision 29, 298 pgs., Jul. 21, 2015.

Hower, Derek R., et al., "Heterogeneous-race-free Memory Models," ASPLOS '14, ACM, p. 1-14, Mar. 1-5, 2014, Salt Lake City, UT, USA.

Protic, Jelica, et al., "Distributed Shared Memory: Concepts and Systems," IEEE Parallel & Distributed Technology: Systems & Application, pp. 63-71, vol. 4, Issue 2, IEEE, Summer 1996.

University of Tennessee, "MPI: A Message-Passing Interface Standard," Message Passing Interface Forum, 868 pgs., Version 3.1, Jun. 4, 2015.

OpenSHMEM, "OpenSHMEM Application Programming Interface," 134 pgs., Version 1.4, Dec. 14, 2017.

Gen-Z Consortium, "Core Specification," 1038 pages, version 1.1, 2020.

Gen-Z Consortium, "Gen-Z Fabric Management Specification," 137 pages, Version 1.0, 2020.

Gen-Z Consortium, "Gen-Z SFF 8639 2.5-Inch Compact Specification," 9 pages, Revision 1.0, 2017.

Gen-Z Consortium, "Gen-Z SFF 8639 2.5-Inch Specification," 5 pages, Revision 1.0, 2017.

Gen-Z Consortium, "Physical Layer Specification," 224 pages, Version 1.1, 2019.

Gen-Z Consortium, "SFF-8201 2.5-Inch with Gen-Z Scalable Connector Specification," 7 pages, Version 1.0, 2018.

* cited by examiner

EFFICIENT MEMORY-SEMANTIC NETWORKING USING SCOPED MEMORY MODELS

CROSS REFERENCE TO RELATED APPLICATION

This application is a continuation of U.S. patent application Ser. No. 17/033,170, filed Sep. 25, 2020, which is incorporated by reference as if fully set forth.

BACKGROUND

A memory consistency model defines how writes by one unit of execution, such as a thread, become visible to another unit of execution. Units of execution can be executed on a same compute device or different compute devices.

When multiple threads are running concurrently, improved performance is possible by relaxing the perceived order of execution of memory operations. For example, it may be more efficient to move a load operation or store operation to later or earlier in an executed thread. For the purposes of the description herein, a store operation may be equivalent to a write and a load operation may be equivalent to a read. A load or store operation can be moved as long as the data loaded/stored at a different time does not result in a program loading/storing erroneous data.

A scoped memory consistency model specifies a scope at which writes are visible. Conventional scoped memory consistency models include scopes up to a single node level. All devices included in the scopes of conventional scoped memory consistency models, such as all devices within the single node, are capable of issuing load or store commands to a memory.

As systems expand to networked computing clusters, programming is time-consuming, tedious, and error prone. Explicit message passing or complex programming is needed for one compute device on a commodity network to load or store to a memory across the commodity network. As used herein, a commodity network includes any network that does not directly support a load/store operation. Further, conventional scoped memory consistency models do not include a scope that includes compute devices across a commodity network. Therefore, a need exists for a new memory consistency model including a "cluster" scope by which devices can directly access remote memory across a commodity network using a load/store interface.

BRIEF DESCRIPTION OF THE DRAWINGS

A more detailed understanding can be had from the following description, given by way of example in conjunction with the accompanying drawings wherein.

DETAILED DESCRIPTION

Figure 1:
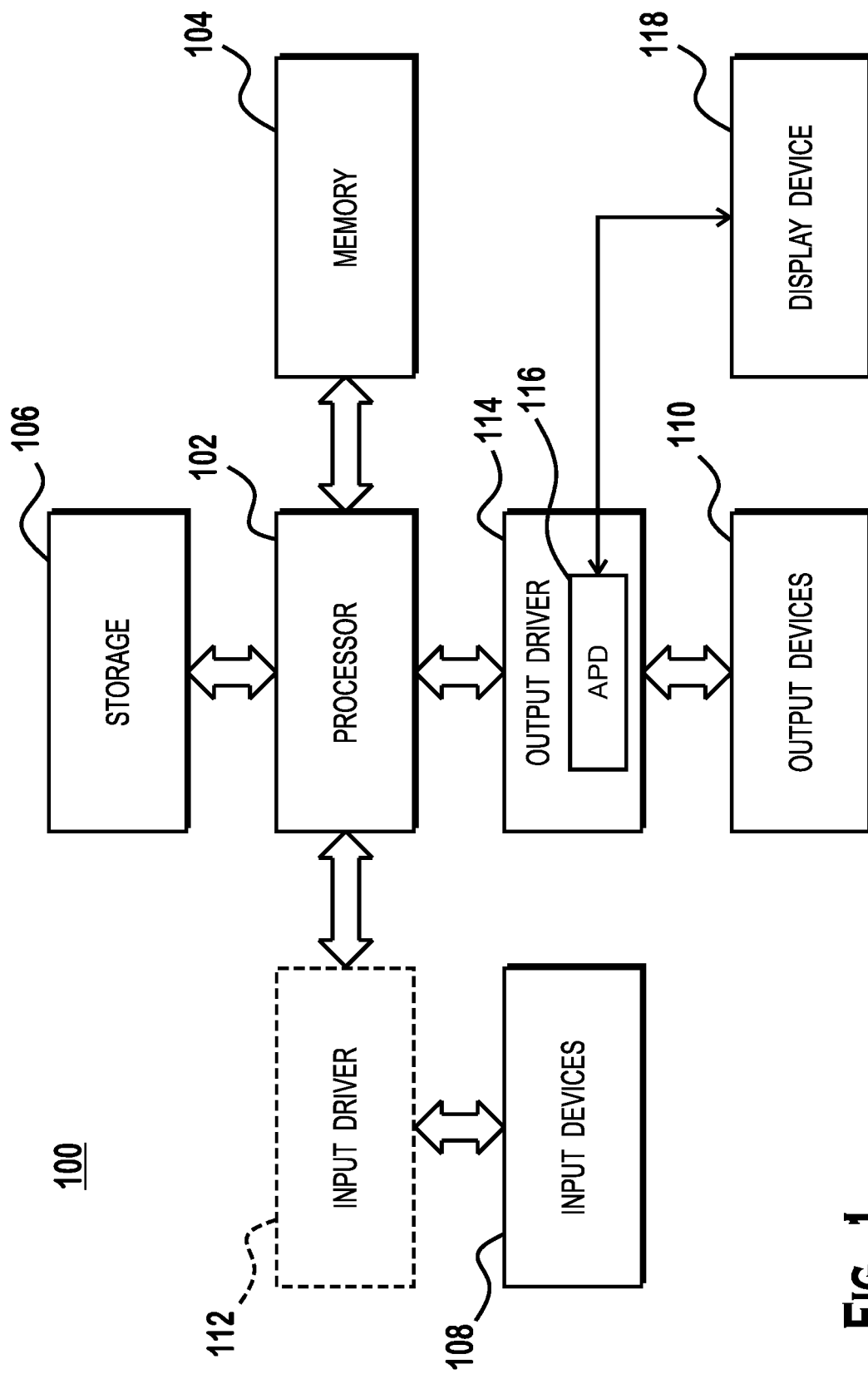
FIG. 1 is a block diagram of an example device in which one or more features of the disclosure can be implemented.

Disclosed herein is a framework by which a device can directly access remote memory across a commodity network using a load/store interface. Through use of a "cluster" scope in the context of a relaxed, scoped-memory consistency model, remote loads and stores are satisfied. Local memory is used to store replicas of remote data. A replica is flushed/invalidated at a fence. Although example embodiments described herein may be framed in context of a graphic processor unit (GPU), the teachings herein are applicable to any compute device, such as a central processing unit (CPU), a CPU core, a digital signal processor (DSP), or any execution unit capable of issuing load/store commands.

Disclosed herein are fence operations which are software operations that enable coherence across memory systems. There are two types of fence operations: a release fence operation and an acquire fence operation. As described above, efficiency and performance can be gained by reordering certain operations for execution that do not otherwise cause problems for execution. A release fence operation creates a boundary wherein it prevents any store operations occurring before the release fence operation from being reordered to a place after the release fence operation. Further, the data of any store operations made locally is made visible to any scope at which the release fence operates. An acquire fence operation creates a boundary at which any locally cached copies of data must be discarded and invalidated. An acquire fence operation works in conjunction with a release fence operation. A producer uses a release fence operation at a particular scope corresponding to a particular visibility within the memory system to make data visible at that particular scope and a consumer uses an acquire fence operation at a particular scope to acquire the correct data.

The framework disclosed herein reduces the complexity of programming networked compute clusters. Use of this framework maintains or improves upon the performance achievable by hand-tuned network communication. The efficient networking primitives described herein are critical for high performance computing and data center workloads. The cluster scope is an extension of a single-node memory consistency model that provides direct load/store semantics to access remote memory. This simplifies scaling applications to multiple nodes over a network.

High performance networked processing can use message passing runtimes, such as the Message Passing Interface (MPI). Message passing runtimes require an application programmer to explicitly schedule data movement by using a send or receive command at a source, and the complement receive or send command at the destination of the data transfer.

An address space that spans an entire cluster of networked compute devices can be partitioned for interfacing with memory across the cluster. Partitioned Global Address Space (PGAS) runtimes and languages, such as that specified by the OpenSHMEM standard, rely on remote put and get commands to access memory across the cluster.

In one PGAS implementation, put and get commands are wrapped around network operations to enable stores and loads to remote memory. These put and get commands are directly provided by the application programmer or generated by the compiler through use of network-aware language constructs. The compiler needs to determine remote vs. local buffers statistically or check at runtime for each memory operation to automatically generate put and/or get commands.

In another implementation, load/store access to any buffer across the networked cluster is achieved through use of page faults at run time. A page fault is used to detect and handle, at runtime, accesses to remote mapped memory similar to conventional use of page faults to handle page migration policies or accesses to data paged off to disk.

The framework described herein extends existing scoped-memory models so that interactions and ordering between loads and/or stores to remote networked memory and local loads and/or stores on a local node are clear and unambiguous. This framework allows programmers, such as GPU programmers, to write networked multi-node applications without understanding network ordering, visibility, and completion semantics.

In another implementation, custom hardware can be used to translate remote loads and stores to network operations. In other implementations, software is used to handle remote loads and stores. In yet other implementations, a combination of custom hardware and software is used.

In another implementation, a method for performing a memory access across a commodity network and a non-transitory computer readable storage medium comprises instructions thereon for execution by at least one processor for performing a memory access across a commodity network is disclosed herein. The method and instructions are for issuing a cluster scope memory access command to a remote memory across the commodity network, wherein the cluster scope memory access command addresses a region of virtual address space of a local memory intended for the remote memory and a data visibility of the cluster scope includes at least the local memory and the remote memory. The method and instructions are further for generating a network operation based on the cluster scope memory access. The method and instructions are further for performing the network operation to put data from a local memory into the remote memory or get data from the remote memory to store in the local memory based on the cluster scope memory access.

In another implementation, the method and instructions are further for determining whether the cluster scope memory access command is coupled with an acquire or release semantic and performing an acquire fence operation or a release fence operation based on the determining. In another implementation, the data is used by a GPU.

In another implementation, the method and instructions are further for ensuring that a physical region of the local memory is allocated corresponding to the region of the virtual address space.

In another implementation, the method and instructions are further for performing a local memory access using the physical region of the local memory.

In another implementation, the method and instructions are further for determining whether the cluster scope memory access command is at least a store operation, a load operation, or an atomic operation. If the cluster scope memory access command is the store operation, a network put command is generated. If the cluster scope memory access command is the load operation, a network get command is generated. If the cluster scope memory access command is the atomic operation, a network atomic command is generated.

In another implementation, the method and instructions are further for attempting a local memory access using the region of virtual address space of the local memory, generating a page fault, and allocating the physical region of the local memory corresponding to the region of the virtual address space.

In another implementation, the method and instructions are further for initializing the physical region of the local memory with the data from the remote memory.

In another implementation, the method and instructions are further for issuing a cluster scope release fence operation to flush data from the physical region of the local memory.

In another implementation, the method and instructions are further for issuing a cluster scope acquire fence operation to update the remote memory with the flushed data.

In another implementation, the method and instructions are further for tracking one or more dirty bytes in the physical region of the local memory, wherein the data flushed from the physical region of the local memory is based on the dirty bytes.

In another implementation, the tracking the one or more dirty bytes uses a ring buffer and the method and instructions are further for issuing a cluster scope release fence operation on a condition that the ring buffer is full.

In another implementation, a method for performing a cluster scope acquire fence operation across a commodity network and a non-transitory computer readable storage medium comprises instructions thereon for execution by at least one processor for performing a cluster scope acquire fence operation across a commodity network is disclosed herein. The method and instructions are for interrupting to a driver. The method and instructions are further for updating one or more pages in a region of local memory corresponding to a remote memory across the commodity network, wherein the updating includes generating one or more network operations to get one or more pages from the remote memory. The method and instructions are further for performing a release fence operation at a scope that is less than the cluster scope, wherein a data visibility of the cluster scope includes at least the local memory and the remote memory.

In another implementation, the updating further includes updating one or more read-only pages in the region of local memory with one or more pages from the remote memory.

In another implementation, the updating further includes releasing one or more read-write pages in the region of local memory.

In another implementation, a method for performing a cluster scope release fence operation across a commodity network and a non-transitory computer readable storage medium comprises instructions thereon for execution by at least one processor for performing a cluster scope release fence operation across a commodity network is disclosed herein. The method and instructions are for interrupting to a driver. The method and instructions are further for performing a release fence operation at a scope that is less than the cluster scope, wherein a data visibility of the cluster scope includes at least a local memory and a remote memory across the commodity network. The method and instructions are further for flushing out dirty bytes in a region of the local memory to at least the remote memory, wherein the flushing out the dirty bytes includes generating one or more network operations to put the dirty bytes on the remote memory.

In another implementation, the scope that is less than the cluster scope includes workgroup scope, agent scope, or system scope.

In another implementation, the driver is for a GPU.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
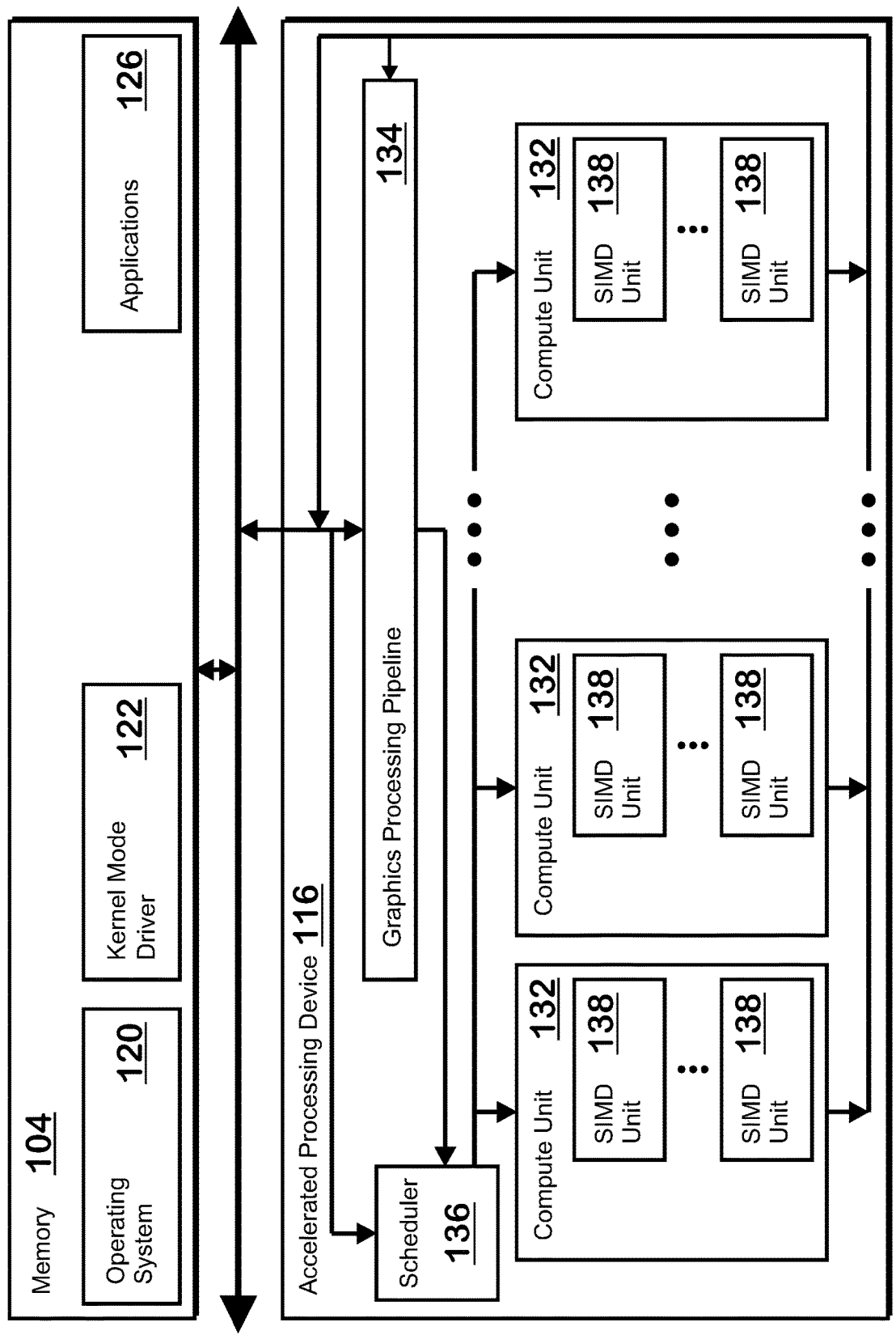
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
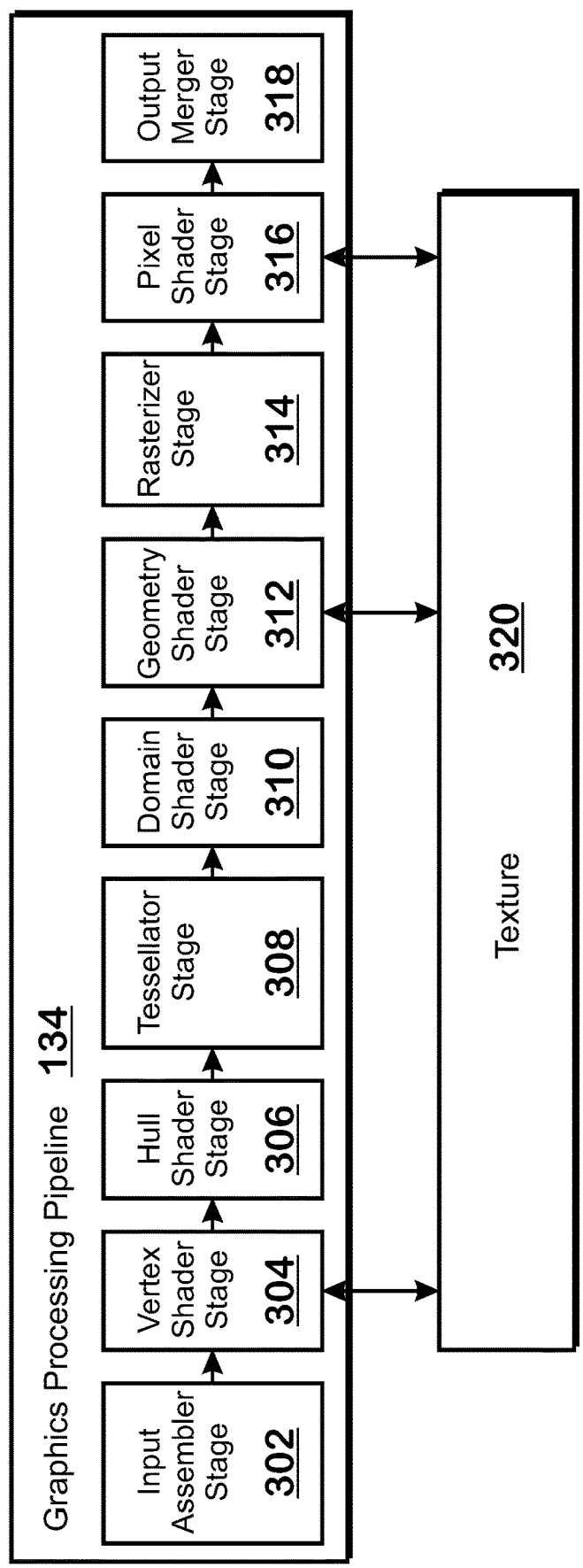
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the programmable processing units 202 perform operations for the geometry shader stage 312.

The rasterizer stage 314 accepts and rasterizes simple primitives and generated upstream. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

Texture data, which defines textures, are stored and/or accessed by the texture unit 320. Textures are bitmap images that are used at various points in the graphics processing pipeline 134. For example, in some instances, the pixel shader stage 316 applies textures to pixels to improve apparent rendering complexity (e.g., to provide a more "photorealistic" look) without increasing the number of vertices to be rendered.

In some instances, the vertex shader stage 304 uses texture data from the texture unit 320 to modify primitives to increase complexity, by, for example, creating or modifying vertices for improved aesthetics. In one example, the vertex shader stage 304 uses a height map stored in the texture unit 320 to modify displacement of vertices. This type of technique can be used, for example, to generate more realistic looking water as compared with textures only being used in the pixel shader stage 316, by modifying the position and number of vertices used to render the water. In some instances, the geometry shader stage 312 accesses texture data from the texture unit 320.

In one implementation, a system may include a single execution unit, for example a GPU, per node or multiple execution units, for example multiple GPUs, per node connected through a commodity network to another node. A GPU may execute a single process or multiple parallel processes. Examples of a GPU includes the processor 102 in FIG. 1 or the APD 116 in FIG. 2. The GPU can include, for example, the Graphics Processing Pipeline 134 in FIG. 3. Again, as noted above, in all examples described herein, another execution unit can be substituted for a GPU as well. Network operations are described herein in terms of a one-sided put( ) command and a one-sided get( ) command. These put( ) and get( ) commands are semantically similar to local stores and loads, and can viewed as remote stores and loads. Further, the implementations described herein can use any network communication model in addition to or as an alternative to put( ) and get( ). For example, message passing or sockets may be used. A mechanism, implemented in hardware, software, or a combination of hardware and software, allows a GPU driver to service page faults relating to memory accesses.

As discussed above, a local copy of remote memory of a node across a commodity network may be used to implement a cluster scope memory model. In one example, to implement the cluster scope memory model, remote physical memory of a node across a commodity network is mapped into the address space of a local device to enable direct load/store accesses by the local device. An application programming interface (API) allocates a local buffer on each device and maps remote buffers corresponding to remote nodes in the address space of the local buffer. The API is called by processes in an application for effecting remote memory access.

In one implementation, the address space of the local buffer that participates in remote network operations is PGAS such that a target remote buffer can be identified from a virtual address. Using a PGAS allocation style allows a remote rank ID to be explicitly derived from a virtual address and enables translation of remote memory operations to rank-based network communications. In one example, a Rank ID indicates a node or process that is involved in a network operation. As such, a Rank ID can be used to disambiguate addresses across nodes that are otherwise not unique.

Figure 4:
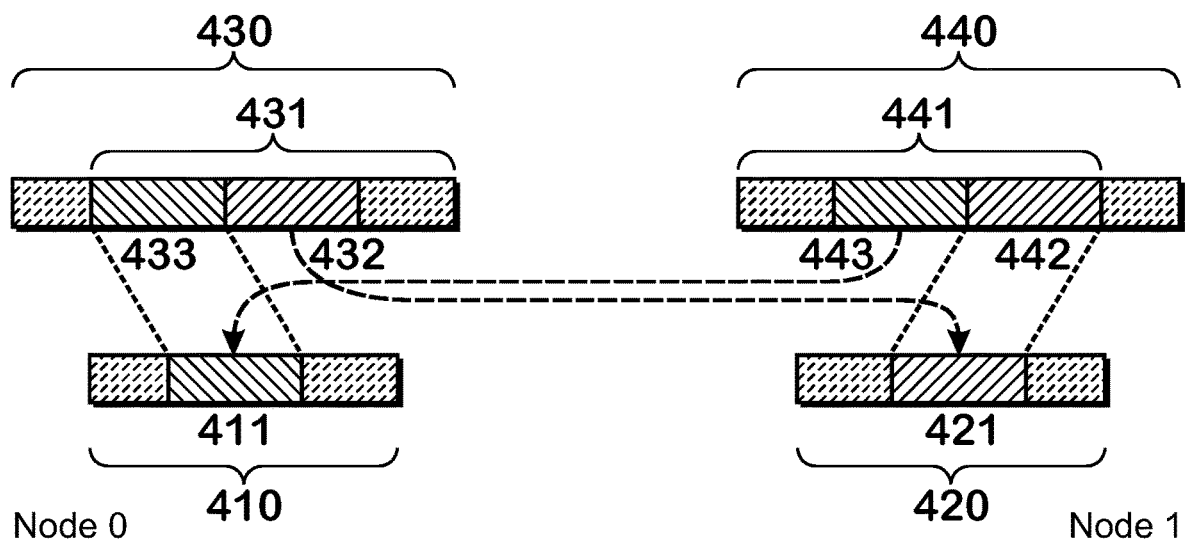
FIG. 4 is a diagram depicting an example of buffer allocation and remote buffer mapping.

FIG. 4 is a diagram depicting an example of buffer allocation and remote buffer mapping. A Node 0 includes a physical address space 410 and a virtual address space 430. The virtual address space 430 includes a remote allocation region 431. A region 411 of physical address space 410 is mapped to a region 433 of the remote allocation region 431. A Node 1 includes a physical address space 421 and a virtual address space 440. The virtual address space 440 includes a remote allocation region 441. A region 421 of physical address space 420 is mapped to a region 442 of the remote allocation region 441. Further, region 421 of physical address space 420 is mapped to region 432 of virtual address space 430 and a region 411 of physical address space 410 is mapped to region 443 of virtual address space 440.

Mappings of physical address space to virtual address space as described above may be similarly understood as mappings of virtual address space to physical address space. For example, it may be similarly viewed that region 433 of remote allocation region 431 is mapped to region 411 of physical address space 410.

Although the regions depicted in FIG. 4 are contiguous and adjacent, a single region may be segmented into multiple regions that may also be discontinuously scattered across an address space. The regions may be adjacent or not.

In one example, physical memory corresponding to local virtual memory, such as region 411 of physical address space 410 corresponding to region 433 of virtual address space 430 may be allocated when the virtual region 433 is allocated, or may be allocated on a first access. In another example, physical memory corresponding to remote memory is initially unmapped to deliberately generate a page fault on a first access. For example, as depicted in FIG. 4, there is no region in physical address space 410 of Node 0 corresponding to region 432 of virtual address space 430.

As similarly described above, load/store operations to remote nodes across a commodity network are transformed to network compatible get( ) and put( ) commands. However, commodity networks do not directly handle load/store requests. In one example, a copy of the remote memory of each of the remote nodes to which the load/stores are directed are stored in local memory buffers for a network interface card (NIC) from which the NIC can perform network operations. Again, as described above, in order to more efficiently use physical memory, pages of remote memory will be locally allocated without a physical backing in the local physical address space. Instead, allocation of a physical backing for a remote memory occurs after a page fault when the virtual region mapped to the remote memory is first accessed.

Figure 5A:
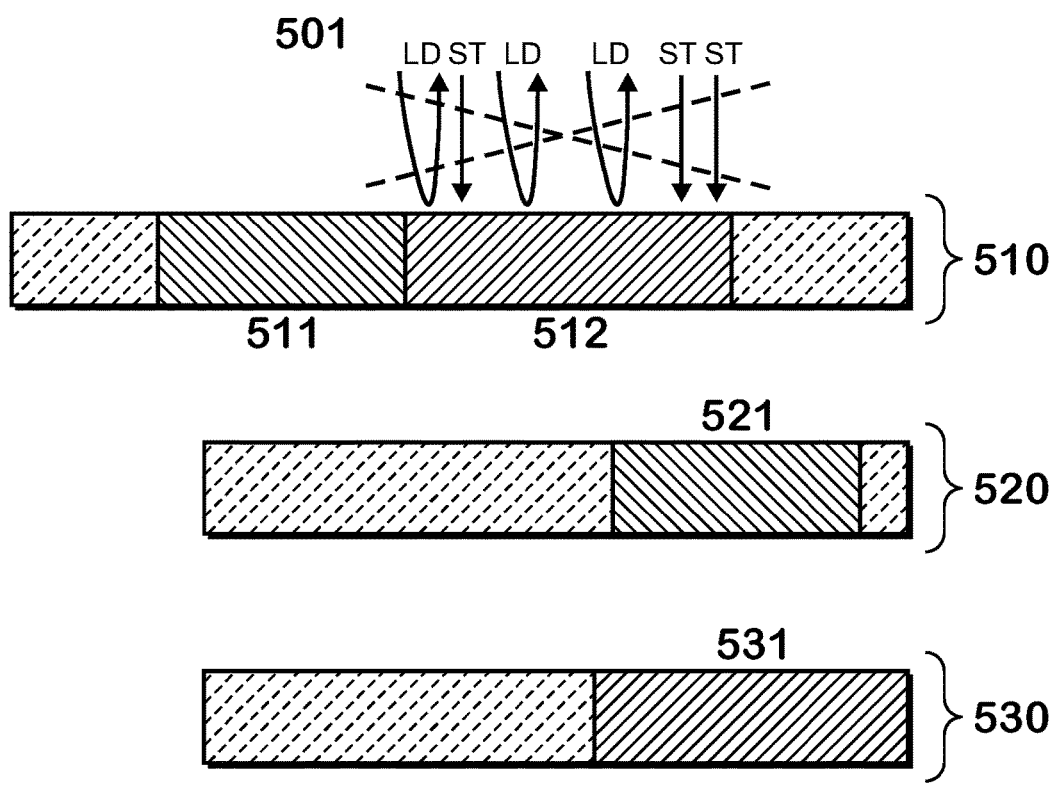
FIG. 5A is a diagram depicting an example implementation of a portion of a networked load/store mechanism.

FIGS. 5A-5D are diagrams depicting an example implementation of networked load/store mechanisms. FIG. 5A depicts a Node 0 virtual address space 510, a Node 0 physical address space 520, and a remote Node 1 physical address space 530. In this description, Node 0 is considered the local node and physical address space 520 is part of local memory. The remote Node 1 is connected to Node 0 via a commodity network in accordance with the above description. Region 521 of physical address space 520 maps to region 511 of virtual address space 510. Region 531 of physical address space 530 maps to region 512 of virtual address space 510.

Region 511 is backed by physical region 521 in local memory. However, as similarly described above with respect to FIG. 4, region 512 is not backed by a physical region in local memory. Thus, a load or store 501 directed to an address within region 512 triggers a page fault to a driver on Node 0.

Figure 5B:
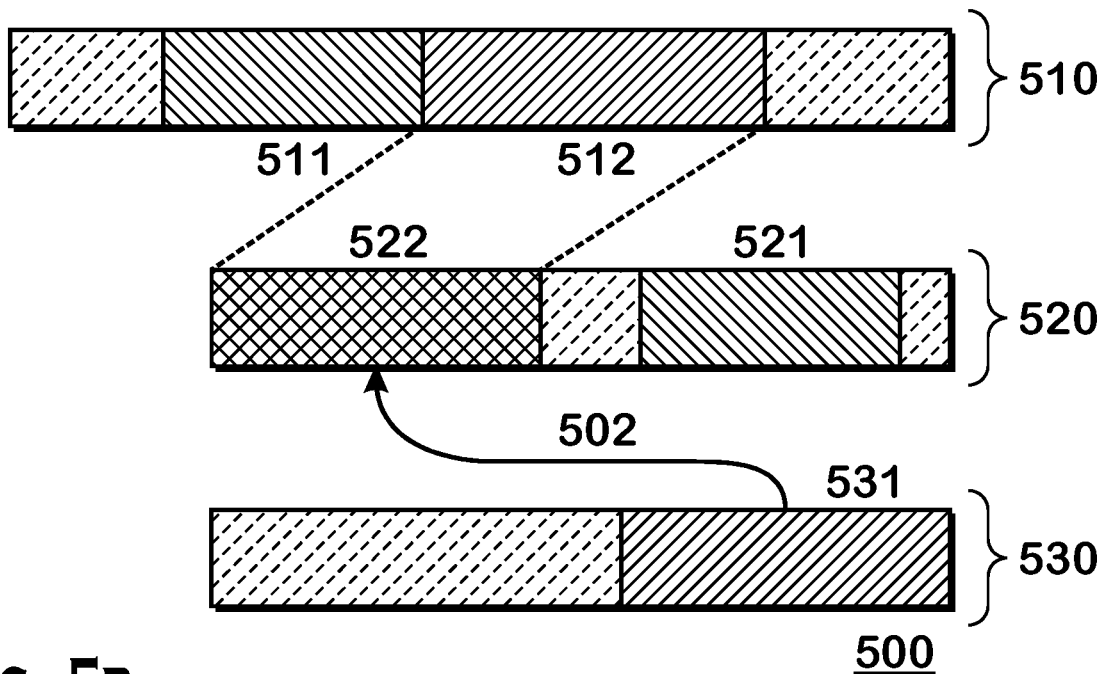
FIG. 5B is a diagram depicting another example implementation of a portion of a networked load/store mechanism.

The driver, based on information provided by the memory management API, identifies the address as a remote address, identifies the rank of the remote memory, and allocates a local region 522 in physical address space 520 as depicted in FIG. 5B. Region 522 may be referred to as remote page cache for Node 1. The remote page cache 522 serves as local non-coherent cache for data corresponding to the remote Node 1. In one example, the remote page cache 522 is restricted in size by the driver to a small subset of total physical memory to prevent excessive physical memory usage for remote pages when many remote nodes have local copies in physical address space 520. If there are no pages available in the remote page cache 522, the driver can remap and potentially flush out existing pages based on heuristics similar to those that would be used to support efficient page migration within a single node. In one example, performance counters, which may be implemented in hardware, software, or a combination thereof, can be used to count memory accesses. The memory accesses can be used to determine which pages to flush. Once physical memory has been allocated for the remote page cache 522, a network operation is performed to copy data 502 from the remote node to the newly allocated physical memory.

Figure 5C:
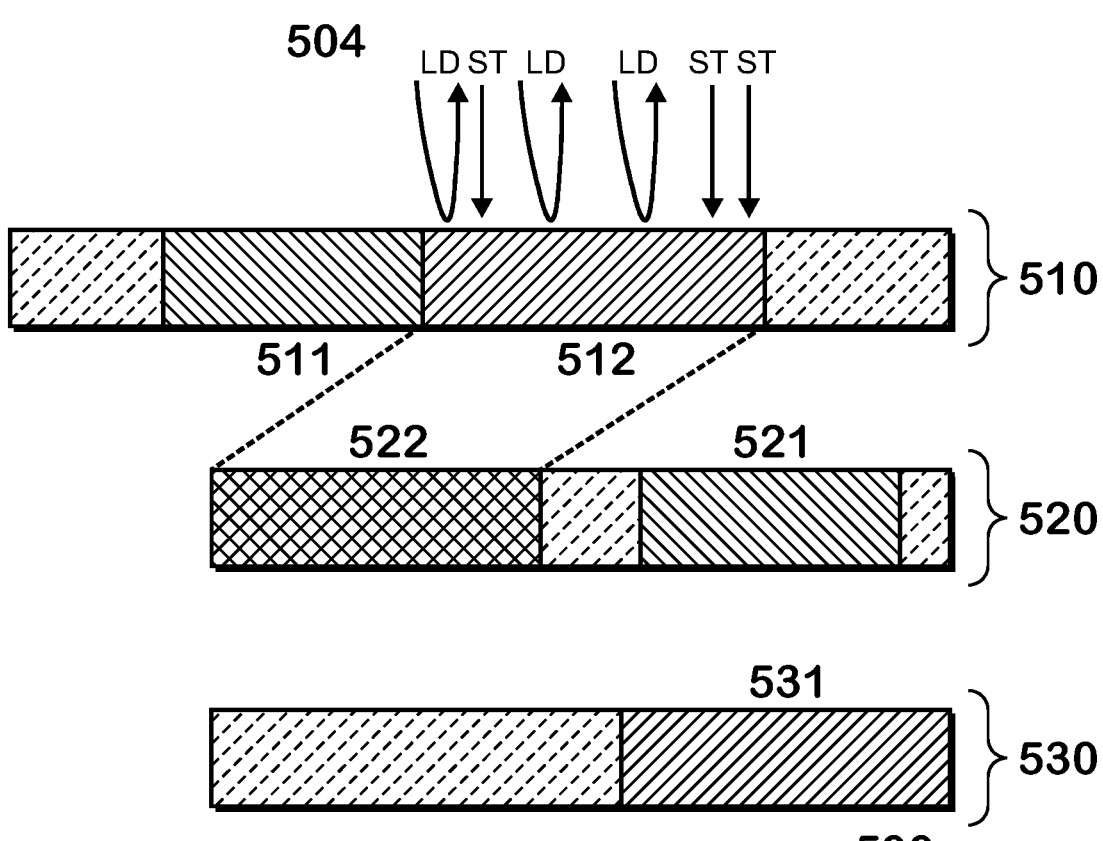
FIG. 5C is a diagram depicting another example implementation of a portion of a networked load/store mechanism.

FIG. 5C depicts the region 512 in virtual address space 510 is physically backed by region 522 in local physical address space 520. Region 522, as described above, is the remote page cache for Node 1 and includes a copy of the data from region 531 of physical address space 530 of the remote memory of Node 1. Subsequent accesses 504, such as loads and stores, to region 512 no longer generate a page fault since the virtual addresses now have a valid mapping in local memory as remote page cache 522. However, updates to region 512 produced by Node 0 are not seen by remote Node 1 and updates to region 531 produced by Node 1 are not seen by Node 0. In other words, region 522, which originally is a copy of region 531, is not coherent with region 531.

To accommodate the lack of coherence between the nodes, an additional scope operation is added to the memory model: the cluster scope. Cluster scope is considered the largest scope in the memory model. Memory operations and fences can be executed at, for example, cluster scope, or lesser scopes such as workgroup scope, agent scope, or system scope. In the incoherent example scenario described above, memory operations, such as load and store, are issued at Node 0 at a scope that is less than cluster scope, for example workgroup scope, agent scope, or system scope. As such, they are not seen by the remote Node 1. Cluster scope operations, on the other hand, are seen by all nodes in the cluster. In the example of Node 0 and Node 1 across a commodity network, cluster scope operations would be seen by both Node 0 and Node 1. Memory operations at less than cluster scope allow for local load/store interactions with a remote page cache stored in local physical memory without requiring expensive network operations to maintain coherency across the commodity network for each local load/store operation.

Changes to the remote page cache, for example due to a store operation to the remote page cache at a scope less than cluster scope, can be flushed out to the rest of the nodes in the cluster via a cluster scope fence operation. At a cluster scope fence boundary, depending on the type of fence operation and whether the page is clean or dirty, the changes can be flushed in a similar manner as how data is flushed out of hardware caches to share across work-groups using a device-scope acquire/release pair of operations. In one example of a device-scope release operation, updated bytes in a hardware cache are written out to a farther away memory or cache to be visible to other threads of that device-scope. In this example, the consumer threads are assumed to perform a device-scope acquire operations to remove stale copies in their respective caches. In an example of a cluster scope release, a device-scope release is performed (along with appropriate device-scope acquires) to ensure that the updated data is visible to the local node. Then the updated bytes, for example of the remote page cache, are released at a cluster scope so that remote node that homes the data is updated over the commodity network. To update the remote node, the updated bytes are transfers through a number of network put( ) commands that are generated in software.

Figure 5D:
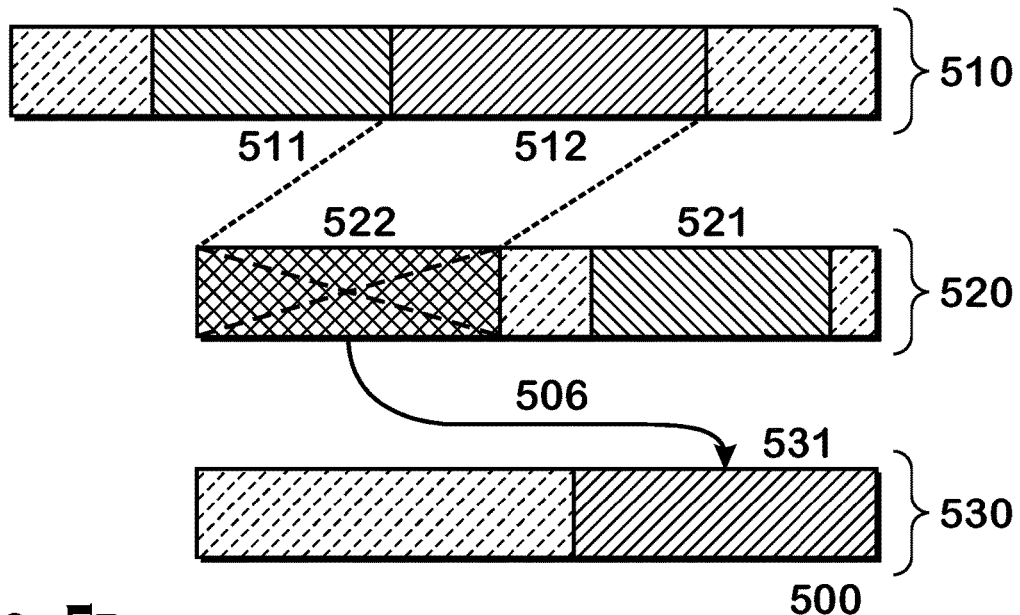
FIG. 5D is a diagram depicting another example implementation of a portion of a networked load/store mechanism.

FIG. 5D is a diagram reflecting the remote page cache 522 being flushed 506 out to region 531 of its home Node 1 physical address space 530. Here the data in region 522 is invalidated by an operation 505 and a release/acquire fence pair of operations are implemented to update remote region 531. The release/acquire fence pair of operations are translated to network put( )/get( ) operations to update the data in remote region 531.

Although a cluster scope is described above in the context of all nodes across a commodity network, alternative scopes are possible that include a subset of nodes. For example, it is possible to define a scope that includes nodes that are proximate to each other. For example, a node that communicates with only its closest neighbor could benefit from a scope operation that applies to a subset of processing elements. In another example, a node that communicates with a single neighbor in a unidirectional ring could benefit from a scope operation that applies to a subset of processing elements. Referring a scope of this nature as a sub-cluster scope, operations of a sub-cluster scope would apply to a particular sub-group of processes/elements instead of acting on all processes/elements in the cluster. For the purposes of conciseness, the description herein refers to cluster scope, but it is equally applicable to a sub-cluster scope.

The description herein is made in the context of the Heterogeneous System Architecture (HSA) memory model, but the principles disclosed herein are applicable to any relaxed, scoped memory model. Further, a "remote" page or memory described herein references a page or memory that is located across a commodity network from a reference node. For example, in the context of FIG. 4 and FIGS. 5A-5D, Node 0 is the reference node and Node 1 is the remote node. In FIG. 4, Node 1 includes remote memory addressed by the physical address space 420, and in FIGS. 5A-5D, Node 1 includes remote memory addressed by the physical address space 530.

In the context of the HSA memory model, a cluster scope operation to a memory segment not visible to the entire cluster defaults to the scope that corresponds to the maximum level of visibility for that memory segment. For example, a cluster scope operation to shared memory that is not visible to the entire cluster is automatically downgraded to, for example, a work-group scope since that is the maximum level of visibility for that shared memory.

A store operation intended for a remote page at less than cluster scope is allowed to buffer locally in the remote page cache as described above. Updates to the remote memory do not need to be pushed out until a cluster scope release fence. The dirty bytes are tracked to identify which bytes to flush out during a cluster scope release fence. In one example, a mask of dirty bytes is tracked. In another example, one or more ring buffers are used that track a write mask corresponding to store operations and the address of each store operation. In one example, instructions for accessing the one or more ring buffers can be generated by a compiler. A programmer can explicitly mark which buffers correspond to remote memory with a label that identifies the type of buffer accordingly. In another example, if a ring buffer becomes full, an early cluster scope release fence can be executed to flush the data.

A load operation pointing to a remote page at less than cluster scope can reference the locally buffered remote page cache. Any updates to the remote page at the remote node are not seen at the local node until a cluster scope acquire fence is performed.

Figure 6:
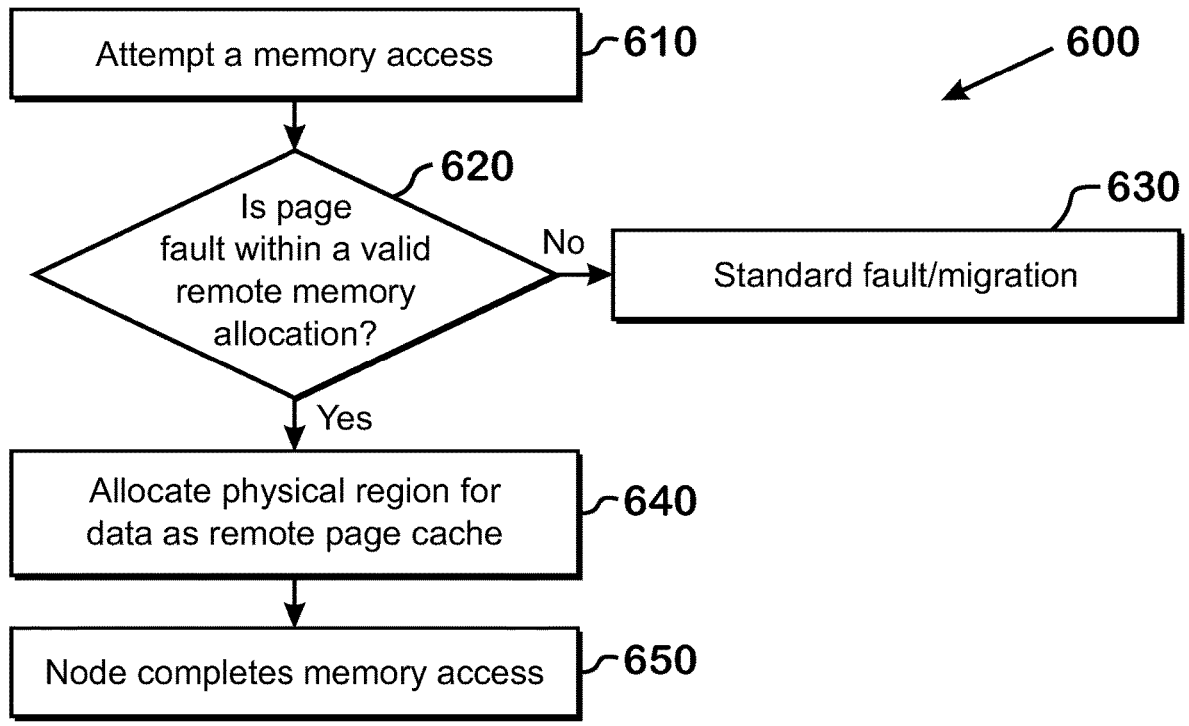
FIG. 6 is a flow diagram depicting an example process for a memory access.

FIG. 6 is a flow diagram depicting an example process for a memory access that generates a page fault when attempting to access a remote page via an operation that is less than the cluster scope. A memory access includes a store operation or a load operation. At 610 a memory access is attempted to an address of a virtual address space that does not have a corresponding allocated physical memory region, also referred to as a physical backing, in the physical address space. For example, in the context of FIG. 5A, a memory access 501 is attempted to region 512.

At 620, a driver checks if the fault falls within a valid remote memory allocation. For example, in the context of FIG. 5A, the driver checks if the fault falls within region 512 which corresponds to remote region 531. If the page fault is not within a valid remote memory allocation, then a standard fault/migration path 630 is followed for a non-remote memory access.

If the page fault is within a valid remote memory allocation, then at 640 a physical region is allocated to act as the remote page cache for data. For example, in the context of FIG. 5B, region 522 is allocated in the physical address space 520 of Node 0 to act as the remote page cache. Although not depicted, the allocation at 640 may also include potentially flushing or dropping other remote page caches if the memory is full. The remote page cache is also initialized by performing a network get( ) command to pull data from the remote memory to the locally allocated remote page cache. For example, in the context of FIG. 5B, region 522 is initialized 502 with data from region 531 of the remote physical address space 530 of Node 1. A network get( ) command is performed whether the memory access that generated the fault is a load operation or a store operation because once the physical region for the remote page cache is allocated, subsequent load operations will not generate a fault and the region needs to be populated with valid data. Further, prefetching of remote pages is beneficial to improve performance of back-to-back accesses to contiguous regions of memory. In some examples, this is referred to as streaming performance. In one example of prefetching of remote pages, a pattern in memory accesses is recognized and used to predict future accesses. For example, a program often accesses memory with predictable gaps in an access stream, such as at addresses 0x0, 0x10, 0x20, 0x30, 0x40, etc. This gap of 0x10 between accesses is recognized by a prefetcher and used to issue memory accesses to predicted addresses that are 0x10 apart before memory accesses to these addresses are generated by a processor itself.

At 650, the node completes the memory access. For example, in the context of FIG. 5C, the memory access 504 of region 512 in virtual address space 510 which corresponds to region 522 in physical address space 520 is completed. For a store operation and/or an atomic operation, as introduced above, the node writes metadata to a ring buffer to track dirty bytes for an eventual release fence. As referenced above, code to implement this feature can be generated by the compiler.

Figure 7:
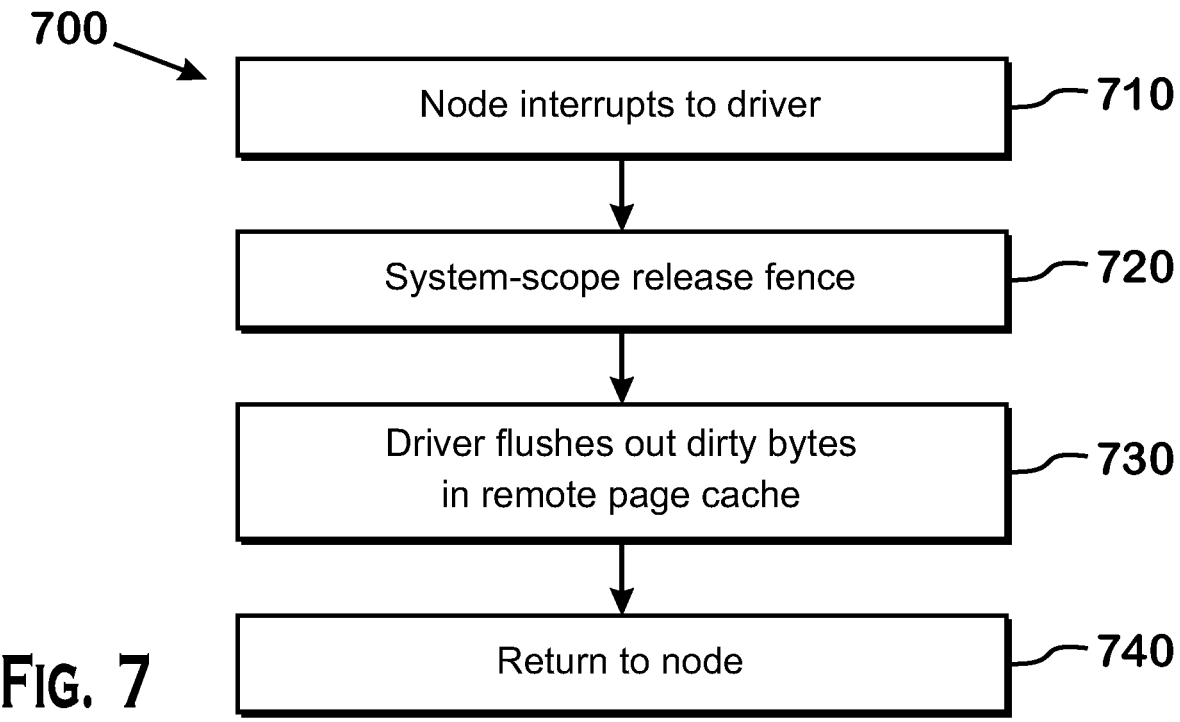
FIG. 7 is a flow diagram depicting an example process for a cluster scope release fence.

FIG. 7 is a flow diagram depicting an example process for a cluster scope release fence. A cluster scope release fence is used to push local dirty bytes back out to their remote home node. At 710, a node interrupts to a corresponding driver. For example, a GPU interrupts to its driver. A node, such as a GPU, is programmed from a perspective of a single thread. However, in practice, many threads often operate concurrently and independently. To avoid the many threads from each attempting to issue cluster scope release fences, the GPU may first perform a system scope fence to synchronize memory for the GPU so then only a single cluster scope release fence is performed to push data out beyond the scope of the GPU and across the commodity network.

In accordance with the HSA memory model, an operation at a particular scope implicitly includes the operation being performed at all smaller scopes. Similarly, at 720, the node performs a release at a scope less than the cluster scope. In the example of a node including a GPU, GPU or CPU software performs a standard system scope release. At 730, the driver flushes out dirty bytes in the remote page cache to the home remote nodes over the commodity network. The driver uses the ring buffer that tracks dirty bytes as previously described and generates appropriate network put( ) commands. Here, it is possible to optimize performance by aggregating data into as large of a network message as possible to improve performance. At 740, operation returns to the node, for example the GPU.

Figure 8:
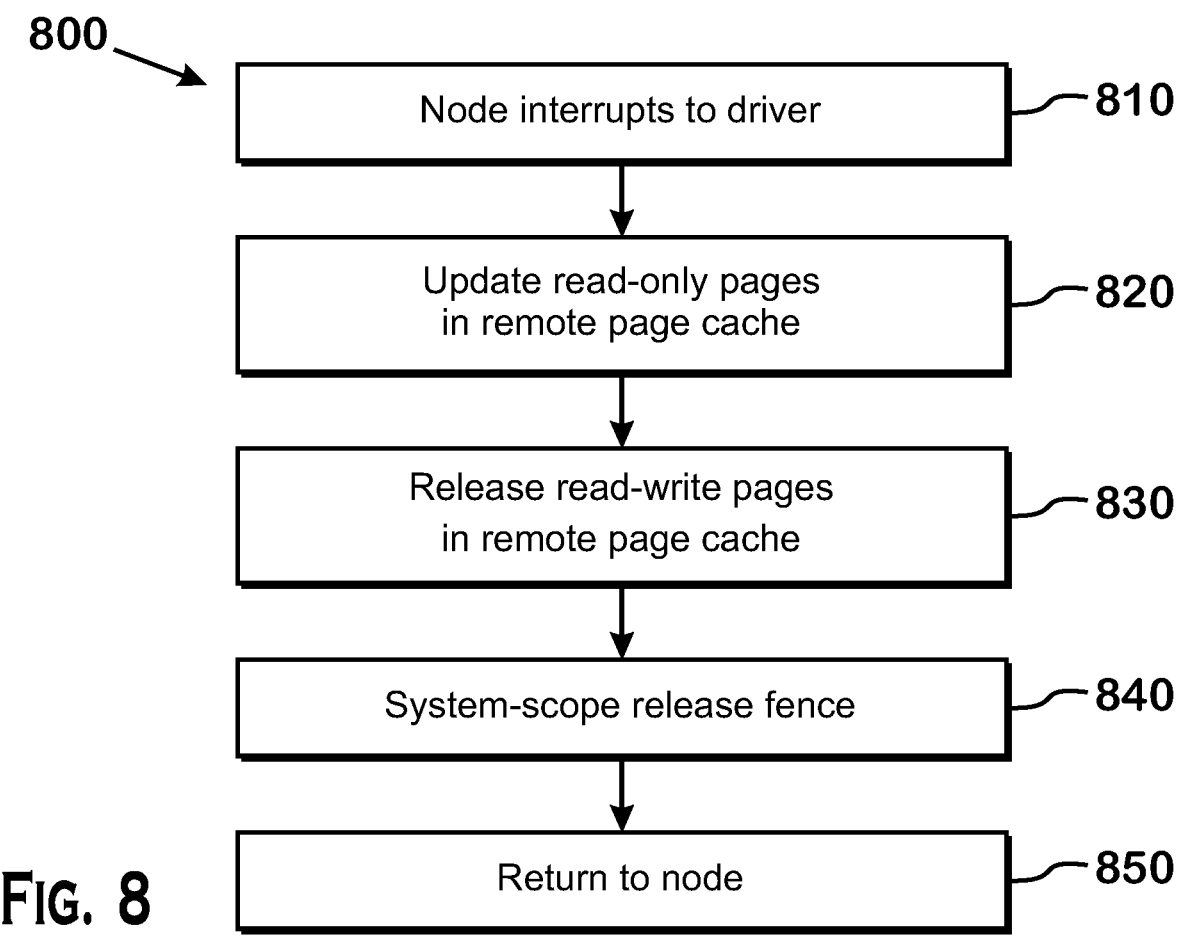
FIG. 8 is a flow diagram depicting an example process for a cluster scope acquire fence.

FIG. 8 is a flow diagram depicting an example process for a cluster scope acquire fence. A cluster scope acquire fence is used by a node to see any released data from other remote nodes in the cluster. At 810, a node interrupts to a corresponding driver. For example, a GPU interrupts to its driver. Similar to the cluster scope release fence described above, to avoid the many threads from each attempting to issue cluster scope release fences, a GPU may first perform a system scope fence to synchronize memory for the GPU and avoid cluster scope release fence flooding.

At 820, the node updates one or more read-only (RO) pages in the remote page cache. Because the page is RO, it has no updated data and does not need to be pushed out to the home remote node. Updating the one or more RO pages can be accomplished by performing a network get( ) command to retrieve a page from the remote node or by unmapping the remote page cache to trigger a page fault on a subsequent access and the remote RO page can then be acquired from the home remote node. At 830, the node releases one or more read-write (RW) pages in the remote page cache. The one or more RW pages can be released via a cluster scope release fence. Then, the RW pages can be treated as RO pages as described above and updated.

At 840, the node performs a release at a scope less than the cluster scope. In the example of a node including a GPU, GPU or CPU software performs a standard system scope release. At 850, operation returns to the node, for example the GPU.

A memory access, such as a load operation or store operation, at cluster scope immediately generates a network command. That is because the data involved in the memory access must be visible to the entire cluster. The cluster scope operation requires that coherency be maintained with nodes across a commodity network and this requires the immediate generation of the network command to make the data visible across the commodity network. A cluster scope memory access may be used as an atomic synchronizing operation in the HSA model during acquire or release operations. A cluster scope memory access does not rely on page faults being handled by a driver because the virtual address accessed may have physical memory allocated in the remote page cache due to a previous memory access to the page at a scope less than cluster scope. Thus, the data could be incoherent due to the memory accesses that are less than cluster scope that have yet to be released.

Figure 9:
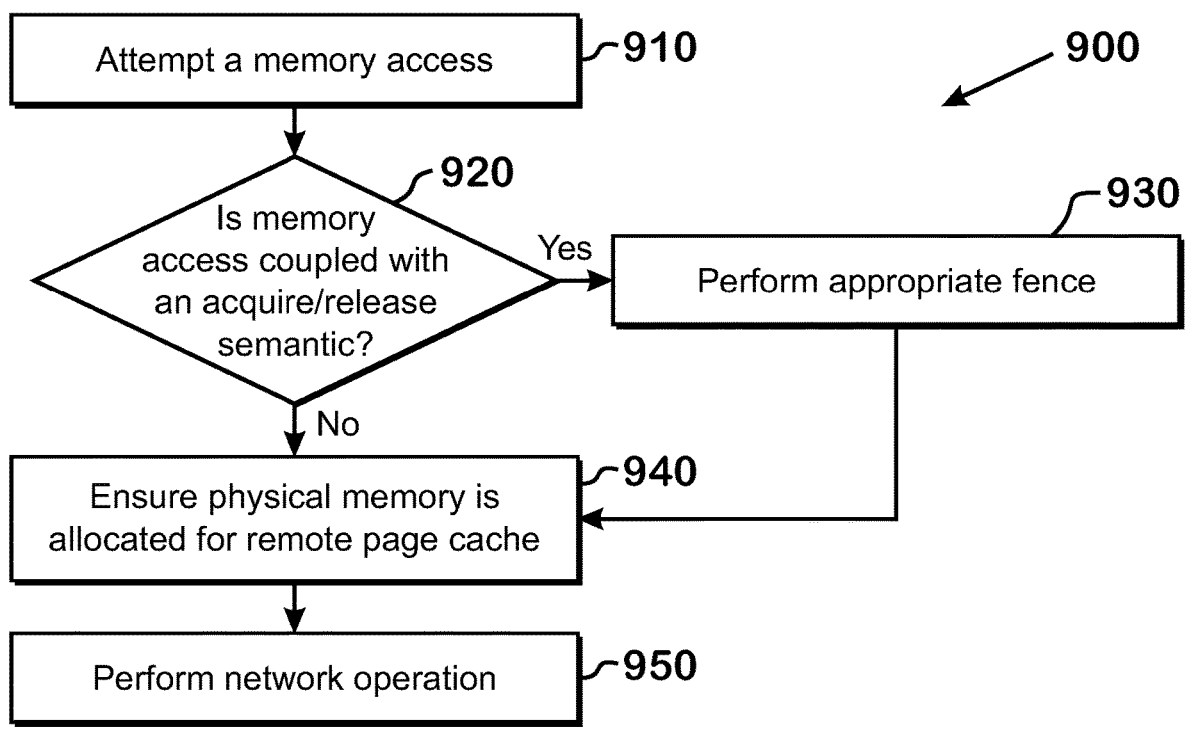
FIG. 9 is a flow diagram depicting an example process for a memory access to a remote page at cluster scope.

FIG. 9 is a flow diagram depicting an example process for a memory access to a remote page at cluster scope. At 910, a node attempts a memory access at cluster scope. At 920, it is determined whether the memory access is coupled with an acquire or release semantic. If the memory access is coupled with an acquire or release semantic, for example an atomic store-release operation, at 930 an appropriate acquire or release fence is performed. In one example, an atomic memory update is combined with a release fence to synchronize and communicate information with other threads. At 940, the node ensures that physical memory is allocated for the remote page cache. If physical memory is not already allocated for the remote page cache, the memory is allocated in accordance with, for example, the process depicted in FIG. 6 and describe above with respect to memory accesses at a scope that is less than cluster scope. If the memory access is a store or atomic operation, the data is placed in the remote page cache. In one example, an atomic operation updates a value in memory. Because the update is part of an atomic operation, the memory is locked, for example in hardware, so that no other updates are performed on the memory, for example by other threads, until a fence operation is complete so that the updated data is visible to the other threads. At 950, a network operation is performed. If the memory access is a store operation, a network put( ) command is generated. If the memory access is a load operation, a network get( ) command is generated followed by a load operation that is less than cluster scope, for example system scope. If the memory access is an atomic operation, a network atomic( ) command is generated. In one example, a network atomic( ) command includes performing an atomic operation on a remote node through a network, such as a commodity network.

Although FIGS. 4-9 depict steps in a particular order and separated into distinct steps, other examples include rearranging, combining, or dividing the steps. Further, intervening steps are possible between those depicted. For example, steps 820 and 830 in FIG. 8 can be swapped in order without departing from the spirit of the disclosure. Further, steps depicted in the FIGS. can be removed.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, and the SIMD units 138 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing a memory access across a commodity network, the method comprising:

issuing a less-than-cluster scope memory access command that addresses an address in a region of virtual address space of a local memory, wherein the region of virtual address space corresponds to remote memory across the commodity network;

issuing at least one less-than-cluster scope memory access command addressing a local physically-backed region of virtual address space;

issuing a cluster scope memory access command to the remote memory across the commodity network, wherein the cluster scope memory access command addresses the local physically-backed region of virtual address space;

translating the cluster scope memory access command into a network operation; and performing the network operation to put one or more dirty bytes from the local memory into the remote memory or get data from the remote memory to store in the local memory based on the cluster scope memory access command.

2. The method of claim 1, wherein the less-than-cluster scope memory access command has a data visibility that does not include the remote memory.

3. The method of claim 1, wherein the issuing the at least one less-than-cluster scope memory access command causes the remote memory to be incoherent with a corresponding region of the local memory.

4. The method of claim 1, wherein a data visibility of the cluster scope includes at least the local memory and the remote memory.

5. The method of claim 1, wherein the performing the network operation makes the local memory coherent with the remote memory.

6. The method of claim 1, wherein the commodity network does not directly support load requests and does not directly support store requests.

7. The method of claim 1, further comprising:

tracking the one or more dirty bytes in the local memory using a ring buffer; and issuing a cluster scope release fence operation on a condition that the ring buffer is full;

wherein data flushed from the local memory is based on the one or more dirty bytes.

8. A computing system, comprising:

a local memory;

a network interface; and at least one processor, wherein one or more of the at least one processor is configured to:

issue a less-than-cluster scope memory access command that addresses an address in a region of virtual address space of the local memory, wherein the region of virtual address space corresponds to remote memory across a commodity network;

issue at least one less-than-cluster scope memory access command addressing a local physically-backed region of virtual address space;

issue a cluster scope memory access command to the remote memory across the commodity network, wherein the cluster scope memory access command addresses the local physically-backed region of virtual address space; and translate the cluster scope memory access command into a network operation; and wherein the network interface is configured to perform the network operation to put one or more dirty bytes from the local memory into the remote memory or get data from the remote memory to store in the local memory based on the cluster scope memory access command.

9. The computing system of claim 8, wherein the less-than-cluster scope memory access command has a data visibility that does not include the remote memory.

10. The computing system of claim 8, wherein the at least one less-than-cluster scope memory access command causes the remote memory to be incoherent with a corresponding region of the local memory.

11. The computing system of claim 8, wherein a data visibility of the cluster scope includes at least the local memory and the remote memory.

12. The computing system of claim 8, wherein the network operation makes the local memory coherent with the remote memory.

13. The computing system of claim 8, wherein the commodity network does not directly support load requests and does not directly support store requests.

14. The computing system of claim 8, wherein the one or more of the at least one processor is further configured to:
  track the one or more dirty bytes in the local memory using a ring buffer; and
  issue a cluster scope release fence operation on a condition that the ring buffer is full;
  wherein data flushed from the local memory is based on the one or more dirty bytes.

15. A non-transitory computer readable storage medium storing instructions thereon for execution by one or more processors of at least one processor, the instructions for:
  issuing a less-than-cluster scope memory access command that addresses an address in a region of virtual address space of a local memory, wherein the region of virtual address space corresponds to remote memory across the commodity network;
  issuing at least one less-than-cluster scope memory access command addressing a local physically-backed region of virtual address space;
  issuing a cluster scope memory access command to the remote memory across the commodity network, wherein the cluster scope memory access command addresses the local physically-backed region of virtual address space;
  translating the cluster scope memory access command into a network operation; and
  performing the network operation to put one or more dirty bytes from the local memory into the remote memory or get data from the remote memory to store in the local memory based on the cluster scope memory access command.

16. The non-transitory computer readable storage medium of claim 15, wherein the less-than-cluster scope memory access command has a data visibility that does not include the remote memory.

17. The non-transitory computer readable storage medium of claim 16, the issuing the at least one less-than-cluster scope memory access command causes the remote memory to be incoherent with a corresponding region of the local memory.

18. The non-transitory computer readable storage medium of claim 16, wherein a data visibility of the cluster scope includes at least the local memory and the remote memory.

19. The non-transitory computer readable storage medium of claim 16, wherein the performing the network operation makes the local memory coherent with the remote memory.

20. The non-transitory computer readable storage medium of claim 16, the instructions further for:
  tracking the one or more dirty bytes in the local memory using a ring buffer; and
  issuing a cluster scope release fence operation on a condition that the ring buffer is full;
  wherein data flushed from the local memory is based on the one or more dirty bytes.

* * * * *